(12) United States Patent
Jiang et al.

(10) Patent No.: US 11,036,079 B2
(45) Date of Patent: Jun. 15, 2021

(54) PIXEL STRUCTURE

(71) Applicant: GIANTPLUS TECHNOLOGY CO., LTD, Miaoli County (TW)

(72) Inventors: I-Ta Jiang, New Taipei (TW); Che-Yao Wu, Taoyuan (TW)

(73) Assignee: GIANTPLUS TECHNOLOGY CO., LTD, Miaoli County (TW)

(*) Notice: Subject to any disclaimer, the term of this patent is extended or adjusted under 35 U.S.C. 154(b) by 0 days.

(21) Appl. No.: 16/703,874

(22) Filed: Dec. 5, 2019

(65) Prior Publication Data

US 2021/0063798 A1   Mar. 4, 2021

(30) Foreign Application Priority Data

Aug. 30, 2019 (TW) ................................ 108131363

(51) Int. Cl.
  *G02F 1/1335* (2006.01)
  *G02F 1/1343* (2006.01)
  *G09G 3/36* (2006.01)

(52) U.S. Cl.
  CPC .... *G02F 1/133553* (2013.01); *G02F 1/13439* (2013.01); *G09G 3/3648* (2013.01)

(58) Field of Classification Search
  CPC .......... G02F 1/133553; G02F 1/13439; G09G 3/3648
  See application file for complete search history.

(56) References Cited

U.S. PATENT DOCUMENTS 7,242,452 B2   7/2007  Jeong et al.
7,995,169 B2 * 8/2011  Higa ................. G02F 1/133555
                                                 349/114

FOREIGN PATENT DOCUMENTS

| JP | H10301142 | 11/1998 |
| TW | I356261 | 1/2012 |
| TW | 201243435 | 11/2012 |
| TW | I387819 | 3/2013 |
| TW | M579739 | 6/2019 |

* cited by examiner

*Primary Examiner* — Dung T Nguyen
(74) *Attorney, Agent, or Firm* — JCIPRNET

(57) ABSTRACT

A pixel structure having a first gray scale display region and a second gray scale display region is provided. The first and the second gray scale display region respectively comprises two first display blocks and a second display block located therebetween. The pixel structure comprises first conductive electrodes, a second conductive electrode, a first active component and a second active component. The first conductive electrodes respectively disposed in the two first display blocks of the first gray scale display region are connected. The second conductive electrode is disposed in the second gray scale display region. The first active component is electrically connected to the first conductive electrodes by a first contact window located at one of the two first display blocks. The second active component is electrically connected to the second conductive electrode by a second contact window located at the second display block.

7 Claims, 4 Drawing Sheets

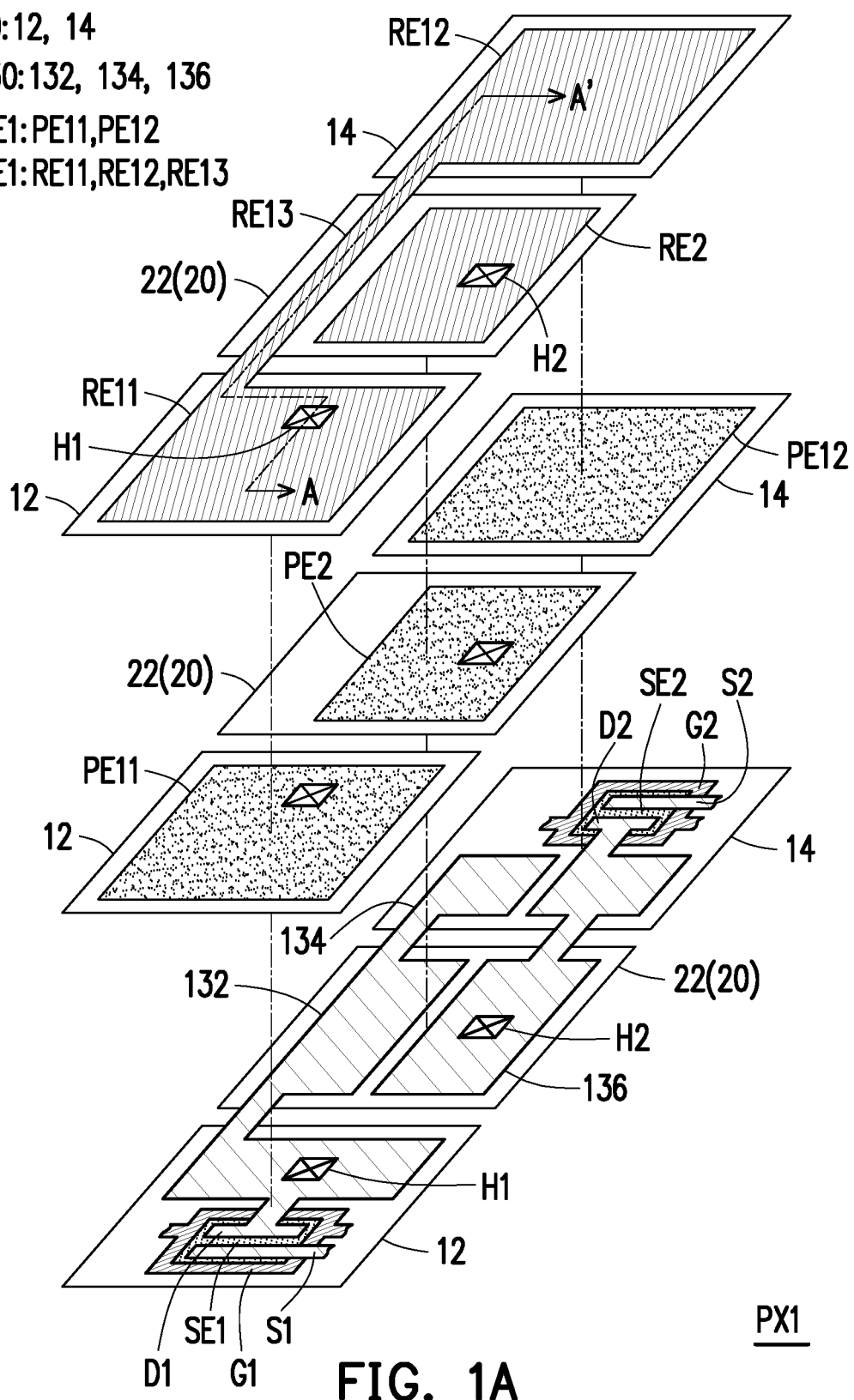

PIXEL STRUCTURE

CROSS-REFERENCE TO RELATED APPLICATION

This application claims the priority benefit of Taiwan application serial no. 108131363, filed on Aug. 30, 2019. The entirety of the above-mentioned patent application is hereby incorporated by reference herein and made a part of this specification.

BACKGROUND

Technical Field

The disclosure is related to a pixel structure, and particularly to a pixel structure displaying a gray scale image with variable brightness, achieved by controlling each display blocks to appear illuminated state or blackout state without changing the driving voltage.

Description of Related Art

The pixel structure which could display a gray scale image with variable brightness is provided variable driving voltages to control the degree of orientation of liquid crystals in the conventional display panel. However, power consumption of the conventional display panel is larger. In order to reduce the power consumption, the pixel structure having a structure divided into a plurality of display blocks is provided. The above pixel structure displays the gray scale image with variable brightness by controlling each display blocks to appear illuminated state or blackout state without changing the driving voltage.

One contact window is essential to dispose in each display blocks to make an electrical connection between an active component and a pixel electrode in above pixel structure displays having the plurality of display blocks, so that the each display blocks could be controlled to appear illuminated state or blackout state. However, it is necessary to remove a portion of an insulating layer located between the active component and the pixel electrode before disposition of the contact window, which make the effect of driving liquid crystals disposed on the location of the contact window unfavorable, so that light leakage phenomenon would be easily produced while the display block appears blackout state. Therefore, the contrast of the display including above pixel structure is poorer while the amount of the contact window is more.

SUMMARY

An embodiment of the disclosure provides a pixel structure, the contrast of the display including which is better.

A pixel structure according to an embodiment of the disclosure has a first gray scale display region and a second gray scale display region. The first gray scale display region includes two first display blocks. The second gray scale display region includes a second display block located between the two first display blocks. The pixel structure includes first conductive electrodes, a second conductive electrode, a first active component, and a second active component. The first conductive electrodes are disposed in the first gray scale display region. The first conductive electrodes respectively disposed in the two first display blocks are connected to each other. The second conductive electrode is disposed in the second gray scale display region and is electrically isolated from the first conductive electrodes. The first active component and the second active component are electrically connected to the first conductive electrodes and the second conductive electrode, respectively. The first active component is electrically connected to the first conductive electrodes via a first contact window located at one of the two first display blocks, and the second active component is electrically connected to the second conductive electrode via a second contact window located at the second display block.

In one embodiment of the disclosure, the pixel structure further includes a substrate and a first insulating layer disposed on the substrate. The first active component is located on the substrate and includes a first gate, a first source, a first drain, and a first semiconductor layer. The first drain is electrically connected to the first conductive electrodes. The first gate is separated from the first source, the first drain, and the first semiconductor layer via the first insulating layer. The second active component is located on the substrate and includes a second gate, a second source, a second drain, and a second semiconductor layer. The second drain is electrically connected to the second conductive electrode. The second gate is separated from the second source, the second drain, and the second semiconductor layer via the first insulating layer.

In one embodiment of the disclosure, the pixel structure further includes a second insulating layer and a planarization layer. The second insulating layer is disposed on the first insulating layer and covers the first active component and the second active component. The planarization layer is disposed on the second insulating layer. The first conductive electrodes and the second conductive electrode are disposed on the planarization layer. The first contact window and the second contact window penetrate the second insulating layer and the planarization layer.

In one embodiment of the disclosure, the pixel structure further includes a first drain extension. The first drain extension is electrically connected to the first active component and is located at the display blocks which are different from the location of the first active component.

In one embodiment of the disclosure, the pixel structure further includes a second drain extension. The second drain extension is electrically connected to the second active component and is located at the display block which is different from the location of the second active component.

In one embodiment of the disclosure, the first conductive electrodes include first pixel electrodes and first reflective electrodes. The first reflective electrodes are disposed on the first pixel electrodes. The first reflective electrodes respectively disposed in the two first display blocks are connected to each other.

In one embodiment of the disclosure, the first conductive electrodes include first pixel electrodes and first reflective electrodes. The first reflective electrodes are disposed on the first pixel electrodes. The first pixel electrodes respectively disposed in the two first display blocks are connected to each other.

In one embodiment of the disclosure, a third insulating layer is disposed between the first pixel electrodes and the first reflective electrodes. The first pixel electrodes are electrically connected to the first reflective electrodes via a third contact window penetrating the third insulating layer. The third contact window and the first contact window are located at the different display block.

In one embodiment of the disclosure, the second conductive electrode includes a second pixel electrode and a second reflective electrode. The second reflective electrode is disposed on the second pixel electrode.

In one embodiment of the disclosure, the first active component and the second active component are respectively disposed in the two first display blocks or are respectively disposed in one of the two first display blocks and the second display block.

Based on the above, since the pixel structure according to an embodiment of the disclosure could reduce the amount of the contact window by making a connection between the two conductive electrodes respectively disposed in the two first display blocks, light leakage phenomenon would be decreased while the two first display blocks or the second display block appear blackout state, so that the contrast of the display including the pixel structure according to an embodiment of the disclosure could be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1A is a schematic view of the pixel structure according to one embodiment of the disclosure.

DESCRIPTION OF THE EMBODIMENTS

Figure 1B:
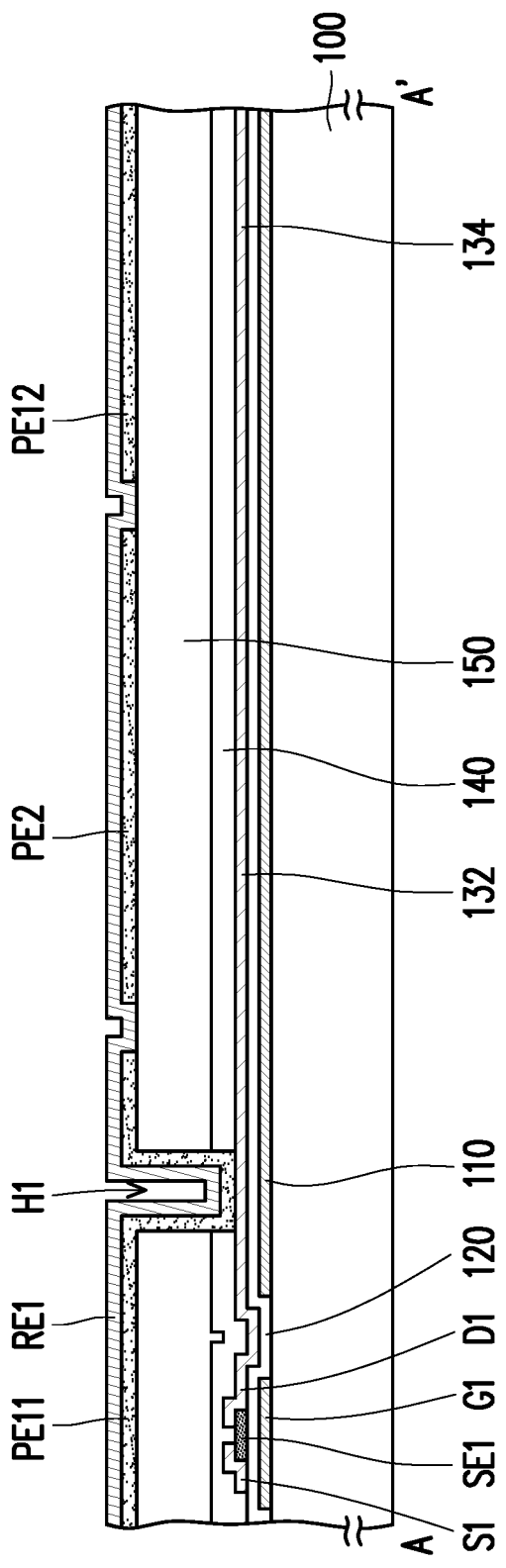
FIG. 1B is a schematic cross-sectional view of the pixel structure taken along a sectional line A-A' depicted in FIG. 1A.

The disclosure is more comprehensively described with reference to the figures of the present embodiments. However, the disclosure may also be implemented in various different forms, and is not limited to the embodiments in the present specification. The thicknesses of the layers and regions in the figures are enlarged for clarity. The same or similar reference numerals represent the same or similar devices and are not repeated in the following paragraphs. Additionally, directional terminology, such as "top," "bottom," "left," "right," "front," or "back," etc., is used with reference to the orientation of the Figure(s) being described. As such, the directional terminology is used for purposes of illustration and is in no way limiting.

FIG. 1A is a schematic view of the pixel structure according to one embodiment of the disclosure. FIG. 1B is a schematic cross-sectional view of the pixel structure taken along a sectional line A-A' depicted in FIG. 1A.

Simultaneously referring to FIG. 1A and FIG. 1B, a pixel structure PX1 according to the disclosure has a first gray scale display region 10 and a second gray scale display region 20. The first gray scale display region 10 and the second gray scale display region 20 could drive liquid crystals (not shown) located on which to orient by applying a driving voltage to which. In detail, for example, whether the first gray scale display region 10 and the second gray scale display region 20 are applied the driving voltage or not could determine the liquid crystals located on corresponding display region to appear illuminated state (namely, the light would be allowed to pass through) or to appear blackout state (namely, the light would blocked). In some embodiments, the first gray scale display region 10 includes two first display blocks 12, 14, and the second gray scale display region 20 includes one second display block 22, wherein the second display block 22 is, for example, located between the two first display blocks 12, 14.

In some embodiments, the pixel structure PX1 includes a first active component T1 and a second active component T2. The first active component T1 and the second active component T2 could be, for example, respectively disposed in the two first display blocks 12, 14 or respectively disposed in one of the two first display blocks 12, 14 and the second display block 22. In the present embodiment, the first active component T1 and the second active component T2 are respectively disposed in the two first display blocks 12, 14, but the disclosure is not limited thereto. In some embodiments, the first active component T1 is located on a substrate 100 and includes a first gate G1, a first source S1, a first drain D1, and a first semiconductor layer SE1, and the second active component T2 is located on the substrate 100 and includes a second gate G2, a second source S2, a second drain D2, and a second semiconductor layer SE2. The first gate G1, the first source S1, the first drain D1, and the first semiconductor layer SE1 are formed, for example, by using a physical vapor deposition (PVD) method or a metal chemical vapor deposition (MCVD) method followed by a photolithography and etching process. As an exemplified example of the formation of the first gate G1, the PVD method or the MCVD method may be used first to form a first metal material layer (not shown) on the overall substrate 100. Next, a patterned photoresist layer (not shown) is formed on the first metal material layer. Thereafter, the patterned photoresist layer is used as a mask to perform an etching process to the first metal material layer, thereby forming a first metal layer 110, wherein the first gate G1 is the portion of the first metal layer 110. In the present embodiment, the first active component T1 and the second active component T2 are any kind of bottom-gate thin film transistor that is known to persons having ordinary skill in the art. In detail, as an exemplified example of the formation of the first active component T1, the steps of the formation of the first active component T1 are introduced below. First, forming the first gate G1 on the substrate 100. Next, forming a first insulating layer 120 covering the first gate G1. Thereafter, forming the first semiconductor layer SE1 corresponding to the first gate G1. Finally, forming the first source S1 and the first drain D1 partially covering the first insulating layer 120 and the first semiconductor layer SE1, wherein the first source S1 and the first drain D1 are belong to the same film layer and are a portion of a second metal layer 130. However, although the present embodiment is exemplified by using the bottom-gate thin film transistor, but the disclosure is not limited thereto. In other embodiments, the first active component T1 and the second active component T2 may be a top-gate thin film transistor or other suitable thin film transistor. In the present embodiment, the size of the first active component T1 may be larger than the size of the second active component T2, but the disclosure is not limited thereto. Compared to the first active component T1 essential to supply the electric power to the two first display blocks 12, 14, the second active component T2 only supplies the electric power to the second display block 22. Therefore, the size of the second active component T2 could be smaller than the size of the first active component T1, so that the layout of the pixel structure PX1 could have a wide diversity.

In some embodiments, the pixel structure PX1 includes a first conductive electrode E1 and a second conductive electrode E2. The first conductive electrode E1 and the second conductive electrode E2 are, for example, respectively disposed in the first gray scale display region 10 and the second gray scale display region 20, and the first conductive electrode E1 and the second conductive electrode E2 are electrically isolated from each other. In the present embodiment, the first conductive electrode E1 includes a first pixel electrode PE1 and a first reflective electrode RE1 disposed on the first pixel electrode PE1, and the second conductive electrode E2 includes a second pixel electrode PE2 and a second reflective electrode RE2 disposed on the second pixel electrode PE2. In a different light, the pixel structure PX1 includes a pixel electrode and a reflective electrode, wherein the pixel electrode includes the first pixel electrode PE1 disposed in the first gray scale display region 10 and the second pixel electrode PE2 disposed in the second gray scale display region 20, and the reflective electrode includes the first reflective electrode RE1 disposed in the first gray scale display region 10 and the second reflective electrode RE2 disposed in the second gray scale display region 20. The material of the first pixel electrode PE1 and the second pixel electrode PE2 may be, for example, a metal oxide conductive material (e.g., indium-tin-oxide, indium-zinc-oxide, aluminum-tin-oxide, aluminum-zinc-oxide, indium-gallium-zinc-oxide) or other suitable transparent conductive material. The material of the first reflective electrode RE1 and the second reflective electrode RE2 may be, for example, a metal, a metal nitride, a metal oxide, a metal nitrogen oxide or the combination of the above materials. In some embodiments, the pixel structure PX1 may further includes a first common electrode (not shown) and a second common electrode (not shown) respectively corresponding to the first pixel electrode PE1 and the second pixel electrode PE2. As an exemplified example of the first common electrode, the first common electrode and the first pixel electrode PE1 could, for example, belong to the same film layer, but the disclosure is not limited thereto. The first common electrode and the first pixel electrode PE1 could, for example, belong to the different film layer.

In some embodiments, the first pixel electrode PE1 includes two first pixel electrodes PE11, PE12 respectively disposed in the two first display blocks 12, 14, and the first reflective electrode RE1 also includes two first reflective electrodes RE11, RE12 respectively disposed in the two first display blocks 12, 14. In the present embodiment, the two first reflective electrodes RE11, RE12 of the first reflective electrode RE1 are connected to each other. In detail, the first reflective electrode RE1 may further include a reflective electrode connection line RE13, and the reflective electrode connection line RE13 extends across the second display block 22 to make a connection between the two first reflective electrodes RE11, RE12 respectively disposed in the two first display blocks 12, 14. The reflective electrode connection line RE13 may be, for example, a line shape, and a side of the reflective electrode connection line RE13 may be, for example, aligned to a side of the two first reflective electrodes RE11, RE12 to make the first reflective electrode RE1 be a U-shape rotating 90 degrees in a clockwise direction, but the disclosure is not limited thereto. In addition, since the first reflective electrode RE1 includes the reflective electrode connection line RE13 extending across the second display block 22, it is necessary for the width (or the length) of the second reflective electrode RE2 to be narrowed, so that the width (or the length) of the second reflective electrode RE2 would be slightly smaller than the width (or the length) of the first reflective electrodes RE11, RE12 to prevent the second reflective electrode RE2 from electrically connecting to the first reflective electrodes RE11, RE12 via the reflective electrode connection line RE13, thereby avoiding the short circuit. It is worth mentioning that although it is necessary for the width (or the length) of the second reflective electrode RE2 to be narrowed, the corresponding length (or the corresponding width) of the second reflective electrode RE2 may be increased to make the size of the second reflective electrode RE2 and the size of the first reflective electrodes RE11, RE12 be substantially the same, thereby preventing the first gray scale display region 10 and the second gray scale display region 20 from having the different reflectance.

In some embodiments, the first conductive electrode E1 and the second conductive electrode E2 are electrically connected to the first active component T1 and the second active component T2, respectively. In detail, the first pixel electrode PE1 of the first conductive electrode E1 is electrically connected to the first drain D1 of the first active component T1, and the second pixel electrode PE2 of the second conductive electrode E2 is electrically connected to the second drain D2 of the second active component T2. In some embodiments, the pixel structure PX1 includes a first contact window H1 and a second contact window H2, wherein the first conductive electrode E1 is electrically connected to the first active component T1 via the first contact window H1, and the second conductive electrode E2 is electrically connected to the second active component T2 via the second contact window H2. Since the two first reflective electrodes RE11, RE12 of the first reflective electrode RE1 in the present embodiment are connected to each other (namely, the first conductive electrodes E1 respectively disposed in the two first display blocks 12, 14 are connected to each other), the first contact window H1 could only be located in one of the two first display blocks 12, 14 of the first gray scale display region 10 to make the first active component T1 be electrically connected to the first conductive electrode E1 via the first contact window H1. In the present embodiment, the first contact window H1 is located in the first display block 12, but the disclosure is not limited thereto. The second contact window H2 is, for example, located in the second gray scale display region 20. In detail, the second contact window H2 is, for example, located in the second display block 22 to make the second active component T2 be electrically connected to the second conductive electrode E2 via the second contact window H2.

Since the first conductive electrode E1 is electrically connected to the first active component T1, the first active component T1 disposed in the first display block 12 could supply the driving voltage to the first pixel electrode PE1 disposed in the first gray scale display region 10 (including the two first display blocks 12, 14) to make the first pixel electrode PE1 and the first common electrode have a different operating voltage, thereby driving the liquid crystals corresponding to the first gray scale display region 10 to orient, thus, the first gray scale display region 10 appears illuminated state. Similarly, since the second conductive electrode E2 is electrically connected to the second active component T2, the second active component T2 disposed in the first display block 14 could supply the driving voltage to the second pixel electrode PE2 disposed in the second gray scale display region 20 (including one second display block 22) to make the second pixel electrode PE2 and the second common electrode have a different operating voltage, thereby driving the liquid crystals corresponding to the second gray scale display region 20 to orient, thus, the second gray scale display region 20 appears illuminated state.

Generally speaking, when the first active component T1 and the second active component T2 are simultaneously opened, three display blocks (including two first display blocks 12, 14 and one second display block 22) would appear illuminated state. When the first active component T1 is opened and the second active component T2 is closed, two display blocks (namely, two first display blocks 12, 14) would appear illuminated state. When the first active component T1 is closed and the second active component T2 is opened, one display block (namely, one second display block 22) would appear illuminated state. When the first active component T1 and the second active component T2 are simultaneously closed, the above three display blocks would appear blackout state. Therefore, the gray scale image with variable brightness would be displayed by opening or closing the first active component T1 or the second active component T2 without changing the driving voltage supplied by the first active component T1 or the second active component T2. Based on the above reason, the power consumption of the display panel including the pixel structure PX1 according to the present disclosure could be reduced.

In some embodiments, the pixel structure PX1 further includes a second insulating layer 140 and a planarization layer 150. The second insulating layer 140 is, for example, disposed on the first insulating layer 120 and covering the first active component T1 and the second active component T2. The planarization layer 150 is, for example, disposed on the second insulating layer 140, and the first conductive electrode E1 and the second conductive electrode E2 are, for example, disposed on the planarization layer 150. The forming method of the second insulating layer 140 and the planarization layer 150 are performed, for example, by using a PVD method or a CVD method. The material of the second insulating layer 140 and the planarization layer 150 may be, for example, an inorganic material (e.g., silicon oxide, silicon nitride, silicon oxynitride, or a stacked layer of at least two of the above materials), an organic material (e.g., a polyimide-based resin, an epoxy-based resin, or an acrylic-based resin) or a combination thereof. The second insulating layer 140 and the planarization layer 150 may be, for example, a single-layered structure, but the disclosure is not limited thereto. In other embodiments, the second insulating layer 140 and the planarization layer 150 may be a multi-layered structure. In some embodiments, the first contact window H1 and the second contact window H2 penetrate the second insulating layer 140 and the planarization layer 150.

In some embodiments, the pixel structure PX1 further includes first drain extensions 132, 134 and a second drain extension 136. In the present embodiment, the first drain extension 132 is located in the second display block 22, and the first drain extension 134 and the second drain extension 136 are located in the first display block 14, but the disclosure is not limited thereto. The disposition of the first drain extensions 132, 134 and the second drain extension 136 depends on the disposition of the first active component T1 and the second active component T2. The first drain extensions 132, 134 and the second drain extension 136 are belong to the same film layer (namely, the second metal layer 130), and the first drain extensions 132, 134 and the second drain extension 136 are, for example, electrically connected to the first active component T1 and the second active component T2, respectively. In the present embodiment, since the second active component T2 and the second pixel electrode PE2 are located in the different display blocks, the second active component T2 could be electrically connected to the second pixel electrode PE2 via the second drain extension 136 of the second drain D2 extended to the second display block 22, thereby supplying driving voltage to the second pixel electrode PE2 located in the second display block 22.

In addition, in the present embodiment, the first drain extension 134 located in the first display block 14 and overlapped the first conductive electrode E1 in the direction of normal projection and the first drain extension 132 located in the second display block 22 and overlapped the second conductive electrode E2 in the direction of normal projection could be used as a storage electrode. In general, each first drain extensions 132, 134, the first metal layer 110 and the first insulating layer 120 located therebetween may, for example, constitute a storage capacitance. The storage capacitance could be used to store the driving voltage, the amount of which may influence orientation of the liquid crystals. Therefore, the amount of the driving voltage stored by the storage capacitance could be further used to control the gray scale image with variable brightness.

In the present embodiment, the pixel structure includes the two first display blocks and the second display block located therebetween, and the gray scale image with variable brightness could be displayed by making each first display block and each second display block appear illuminated state or blackout state. Moreover, the pixel structure according to the present embodiment could reduce the amount of the contact window by making a connection between the two first reflective electrodes respectively disposed in the two first display blocks. Therefore, light leakage phenomenon would be decreased while the two first display blocks or the second display block appear blackout state, so that the contrast of the display including the pixel structure according to the present embodiment of the disclosure could be improved.

Figure 2A:
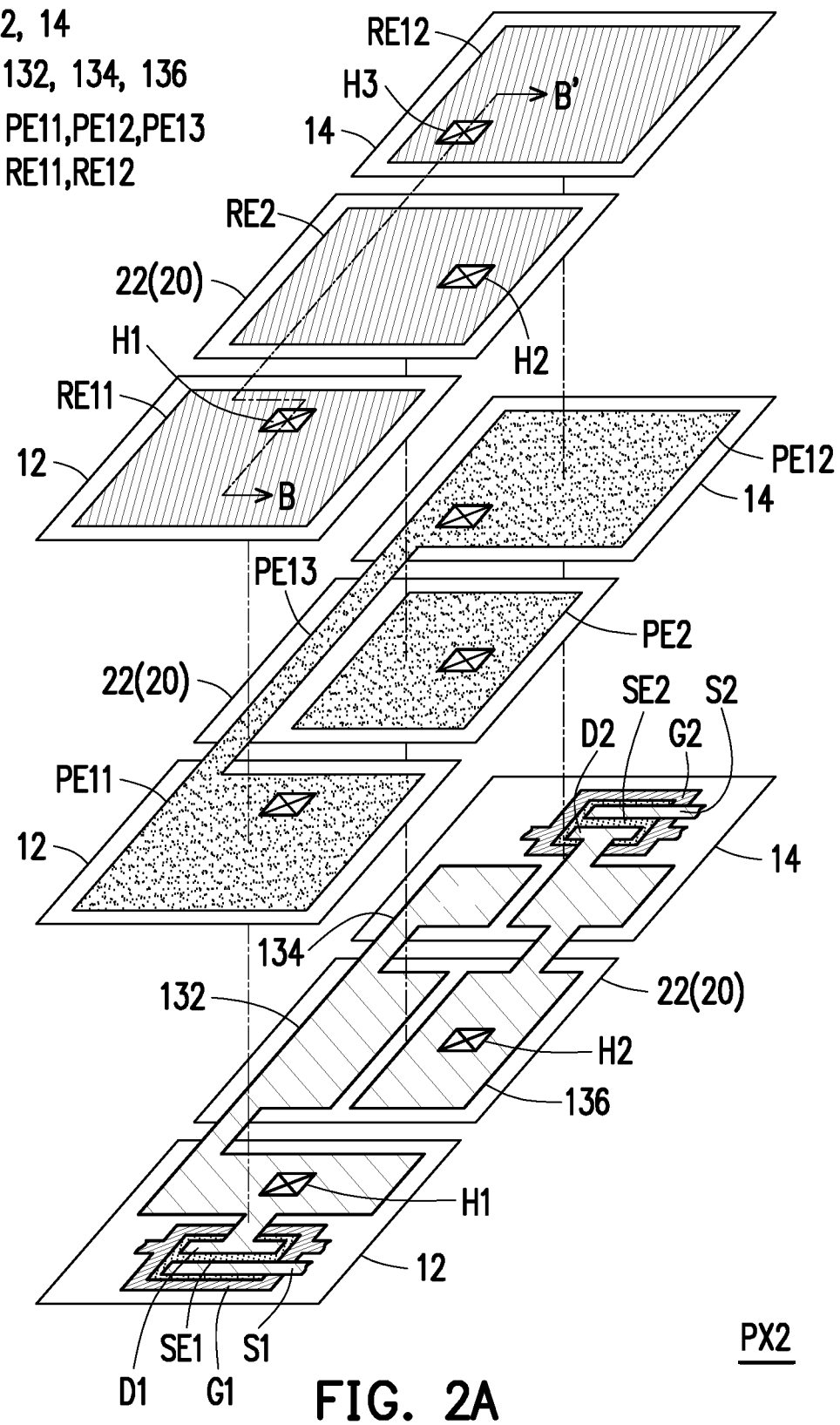
FIG. 2A is a schematic view of the pixel structure according to another embodiment of the disclosure.
Figure 2B:
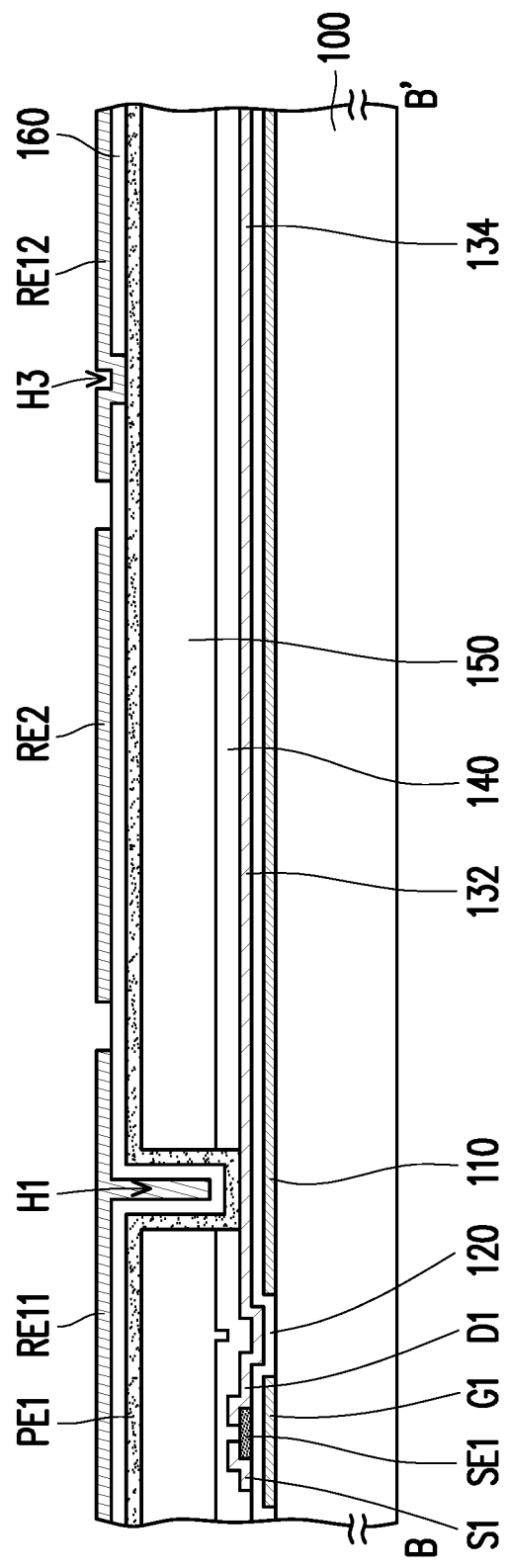
FIG. 2B is a schematic cross-sectional view of the pixel structure taken along a sectional line B-B' depicted in FIG. 2A.

FIG. 2A is a schematic view of the pixel structure according to another embodiment of the disclosure, and FIG. 2B is a schematic cross-sectional view of the pixel structure taken along a sectional line B-B' depicted in FIG. 2A. It should be noted here that the embodiment of FIG. 2A and FIG. 2B respectively adopt the element symbols and partial contents of the embodiment of FIG. 1A and FIG. 1B. The same or similar symbols are used to denote the same or similar elements, and the description of the same technical contents is omitted. For the description of the omitted part, reference is made to the description and effects of the foregoing embodiments, and the descriptions thereof are omitted in the following embodiment. For the description of at least a part of the embodiment of FIG. 2A and FIG. 2B that is not omitted, reference is made to the contents below.

Simultaneously referring to FIG. 2A and FIG. 2B, in the embodiment shown in FIG. 2A and FIG. 2B, a layout of a pixel structure PX2 is different from the layout of the pixel structure PX1, which would be described in detail below.

First, the two first pixel electrodes PE11, PE12 of the first pixel electrode PE1 are connected to each other in the pixel structure PX2 according to an embodiment of the disclosure (namely, the first conductive electrodes E1 respectively disposed in the two first display blocks 12, 14 are connected to each other), and the two first reflective electrodes RE11, RE12 of the first reflective electrode RE1 are not connected to each other. In detail, the first pixel electrode PE1 may further include a pixel electrode connection line PE13 used to make a connection between the two first pixel electrodes PE11, PE12, and the pixel electrode connection line PE13 extends across the second display block 22 to make a connection between the two first pixel electrodes PE11, PE12 respectively disposed in the two first display blocks 12, 14. The pixel electrode connection line PE13 may be, for example, a line shape, and a side of the pixel electrode connection line PE13 may be, for example, aligned to a side of the two first pixel electrodes PE11, PE12 to make the first pixel electrode PE1 be a U-shape rotating 90 degrees in a clockwise direction, but the disclosure is not limited thereto. In addition, since the first pixel electrode PE1 includes the pixel electrode connection line PE13 extending across the second display block 22, it is necessary for the width (or the length) of the second pixel electrode PE2 to be narrowed, so that the width (or the length) of the second pixel electrode PE2 would be slightly smaller than the width (or the length) of the first pixel electrodes PE11, PE12 to prevent the second pixel electrode PE2 from electrically connecting to the first pixel electrodes PE11, PE12 via the pixel electrode connection line PE13, thereby avoiding the short circuit.

Furthermore, the pixel structure PX2 according to the present embodiment of the disclosure further includes a third insulating layer 160. The third insulating layer 160 is, for example, disposed between the first pixel electrode PE1 and the first reflective electrode RE1. The first pixel electrode PE1 and the first reflective electrode RE1 are electrically connected to each other via a third contact window H3 penetrating the third insulating layer 160. The third contact window H3 and the first contact window H1 are, for example, located at the different first display block. As an exemplified example shown in FIG. 2A, the third contact window H3 and the first contact window H1 are respectively located at the first display block 14 and the first display block 12. The disposition of the third contact window H3 is for the purpose of preventing the second reflective electrode RE2 located in the second display block 22 from electrically connecting to the pixel electrode connection line PE13 extending across the second display block 22, thereby avoiding the short circuit. In addition, as stated in the following embodiment, if it is necessary for the width (or the length) of the second reflective electrode RE2 to be narrowed, the corresponding length (or the corresponding width) of the second reflective electrode RE2 may be increased to make the size of the second reflective electrode RE2 and the size of the first reflective electrodes RE11, RE12 be substantially the same, thereby preventing the first gray scale display region 10 and the second gray scale display region 20 from having the different reflectance. Since it is not necessary for the width (or the length) of the second reflective electrode RE2 to be narrowed to be substantially the same as the width (or the length) of the second pixel electrode PE2 while the pixel electrode connection line PE13 was disposed, thereby avoiding increasing the cost and the difficulty in the manufacturing process.

In the present embodiment, the pixel structure includes the two first display blocks and the second display block located therebetween, and the gray scale image with variable brightness could be displayed by making each first display block and each second display block appear illuminated state or blackout state. Moreover, the pixel structure according to the present embodiment could reduce the amount of the contact window by making a connection between the two first pixel electrodes respectively disposed in the two first display blocks. Therefore, light leakage phenomenon would be decreased while the two first display blocks or the second display block appear blackout state, so that the contrast of the display including the pixel structure according to the present embodiment of the disclosure could be improved.

In summary, the pixel structure according to the disclosure includes the two first display blocks and the second display block located therebetween, and the gray scale image with variable brightness could be displayed by making each first display block and each second display block appear illuminated state or blackout state. Moreover, the pixel structure according to the present embodiment could reduce the amount of the contact window by making a connection between the two conductive electrodes respectively disposed in the two first display blocks. Therefore, light leakage phenomenon would be decreased while the two first display blocks or the second display block appear blackout state, so that the contrast of the display including the pixel structure according to the present embodiment of the disclosure could be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel structure, having a first gray scale display region and a second gray scale display region, wherein the first gray scale display region includes two first display blocks, and the second gray scale display region includes a second display block located between the two first display blocks, and comprising:
   first conductive electrodes, disposed in the first gray scale display region,
   wherein the first conductive electrodes respectively disposed in the two first display blocks are connected to each other,
   wherein the first conductive electrodes comprises:
      first pixel electrodes; and
      first reflective electrodes, disposed on the first pixel electrodes,
      wherein the first reflective electrodes respectively disposed in the two first display blocks are connected to each other via a reflective electrode connection line, and a first reflective electrode layer consists of the first reflective electrodes and the reflective electrode connection line;
   a second conductive electrode, disposed in the second gray scale display region and is electrically isolated from the first conductive electrodes; and
   a first active component and a second active component, electrically connected to the first conductive electrodes and the second conductive electrode, respectively,
   wherein the first active component is electrically connected to the first conductive electrodes via one first contact window located at one of the two first display blocks, and the second active component is electrically connected to the second conductive electrode via a second contact window located at the second display block.

2. The pixel structure according to claim 1, further comprising a substrate and a first insulating layer disposed on the substrate,
   wherein the first active component is located on the substrate and includes a first gate, a first source, a first drain, and a first semiconductor layer, the first drain is electrically connected to the first conductive electrodes, and the first gate is separated from the first source, the first drain, and the first semiconductor layer via the first insulating layer, wherein the second active component is located on the substrate and includes a second gate, a second source, a second drain, and a second semiconductor layer, the second drain is electrically connected to the second conductive electrode, and the second gate is separated from the second source, the second drain, and the second semiconductor layer via the first insulating layer.

3. The pixel structure according to claim 2, further comprising:

a second insulating layer, disposed on the first insulating layer and covering the first active component and the second active component; and a planarization layer, disposed on the second insulating layer, wherein the first conductive electrodes and the second conductive electrode are disposed on the planarization layer, wherein the first contact window and the second contact window penetrate the second insulating layer and the planarization layer.

4. The pixel structure according to claim 2, further comprising a first drain extension, wherein the first drain extension is electrically connected to the first active component and is located at the display blocks which are different from the location of the first active component.

5. The pixel structure according to claim 2, further comprising a second drain extension, wherein the second drain extension is electrically connected to the second active component and is located at the display blocks which are different from the location of the second active component.

6. The pixel structure according to claim 1, wherein the second conductive electrode comprises a second pixel electrode and a second reflective electrode disposed on the second pixel electrode.

7. The pixel structure according to claim 1, wherein the first active component and the second active component are respectively disposed in the two first display blocks or are respectively disposed in one of the two first display blocks and the second display block.

* * * * *